Figure 1:
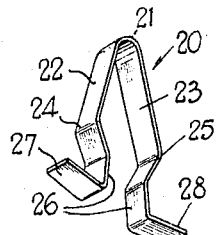
Figure 3:
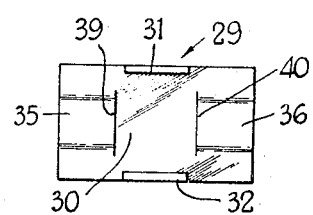
Figure 5:
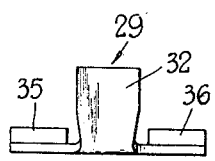

Dec. 16, 1958     E. B. FERNBERG     2,864,472
FASTENERS
Filed June 7, 1955

Inventor
Eric Birger Fernberg
by Malcolm W. Fraser
attorney

United States Patent Office 2,864,472
Patented Dec. 16, 1958

2,864,472

FASTENERS

Eric Birger Fernberg, Northwood, England, assignor to F. T. Products Limited, London, England, a British company Application June 7, 1955, Serial No. 513,845

2 Claims. (Cl. 189—88)

The present invention relates to an improved fastener which may be used with advantage for the purpose of securing a trim-pad to a sheet metal panel of an automobile. The use of the fastener is not limited in this way, however.

It is common practice at the present time to trim the inside of an automobile with sheets of hardboard to one face of each of which is secured trim material such as leather-cloth, Rexine or fabric. The trim material is glued or otherwise secured to the board and the board is in turn secured to the metal panel with the aid of a plurality of fasteners which are attached to the board and which are sprung into holes formed for this purpose in the panel. A fastener suitable for this purpose comprises, essentially, a retainer which is fixed in the board before the trim is put on the board, and a snap-engaging spring stud the feet of which engage in the retainer and the limbs of which are formed with elbows providing snap-engagement with the holes in the panels.

Such fasteners are perfectly satisfactory provided that the finished trim-pad is not treated in any way after the retainer portion of each fastener has been inserted in the board.

At the present time, however, the car manufacturers apply to the rear face of the board (i. e., the face adjacent the occupants of the car) a sheet of cotton wool or like loose material covered by a sheet of Rexine or the like, then glue the sheet of Rexine around the edges of the front face of the board, lap it around the rear face of the board to overlie the cotton wool, then place the composite trim-pad in a press and impress a decorative pattern on the rear (i. e., the outer) face of the Rexine.

It is to be noted, therefore, that the metal retainer portion of each fastener has to be affixed to the board before the cotton wool and Rexine is applied. Now the retainers used hitherto often stand proud of the board so that when the pad is squeezed in a press, to apply the decorative design, the outline of the retainer shows up on the Rexine or the like, spoiling the design.

It is an object of this invention to provide an improved fastener which obviates the above mentioned disadvantages.

According to this invention there is provided a two-part snap fastener for securing a sheet formed with a cruciform hole to a panel formed with an aperture, comprising a snap stud in the form of single strip of spring metal bent to U-shape and having snap-engaging elbows, a neck and outwardly directed feet; and a retainer having a plate-like body formed with spaced aligned tunnels under which the feet of the stud can be engaged and which tunnels substantially fill the cross arms of the cruciform hole, and with arms of width substantially equal to the width of the stem of the T of the cruciform hole which arms extend upwardly from the plate-like body and can be clenched on to the sheet so that the retainer grips the sheet between the plate-like body and the arms; the retainer substantially filling the hole.

Figure 2:
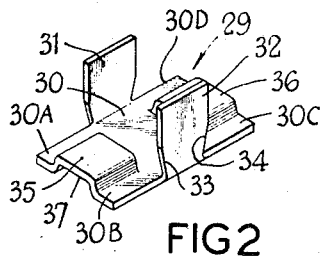
Figure 4:
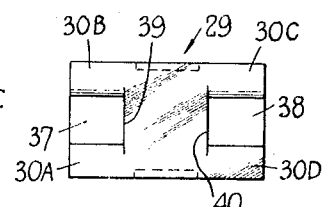
Figure 6:
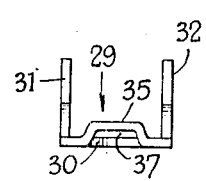
Figure 9:
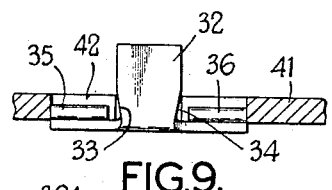
Figures 7, 8:
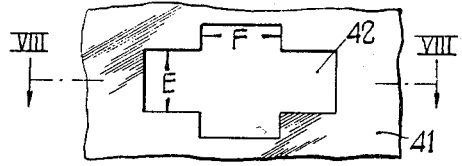
Figure 10:
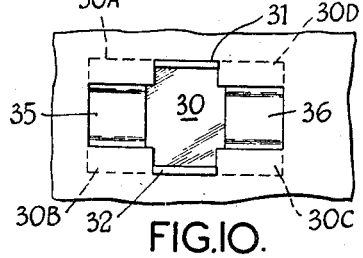
Figures 11, 12:
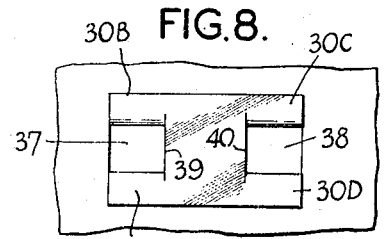
Figure 13:
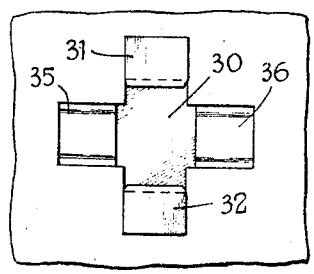
Figure 14:
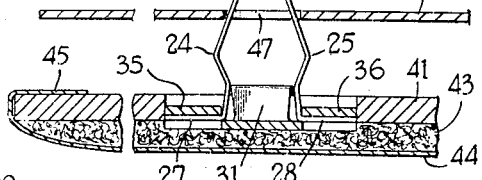

A preferred form of the invention will now be described, by way of example, with reference to the accompanying drawings in which, Figure 1 is a perspective view of a spring stud portion of a two-part fastener, Figure 2 is a perspective view of a retainer portion of the same fastener, Figures 3, 4, 5 and 6 are respectively a plan, under-plan, side and end elevation of the retainer shown in Figure 2, Figure 7 is a plan view of a portion of a sheet of hardboard showing the shape of hole made in it to receive a retainer of the kind shown in Figure 2, Figure 8 is a section on the line VIII—VIII of Figure 7, Figure 9 is a section similar to that of Figure 8 but showing a retainer inserted in the hole from the rear face of the board, Figures 10 and 11 are respectively a plan and under-plan of the arrangement of Figure 9, Figure 12 is a plan, similar to Figure 10, but showing the arms of the retainer clenched down onto the front or upper face of the board, Figure 13 is a section through the board and showing cotton wool and Rexine applied to the rear face of the board, and Figure 14 is a view similar to that of Figure 13 but showing a spring stud of the kind shown in Figure 1 engaged in the retainer and about to be snapped through a hole in a metal panel.

At 20 in Figure 1 is shown the spring stud portion of a two-part fastener. The stud is made from a single strip of metal which at its centre is bowed to form a nose 21 and two limbs 22 and 23. These limbs are bent to form elbows 24 and 25 and a neck portion 26. Finally the ends of the two limbs are bent outwardly and oppositely to form feet 27 and 28.

The other part of the two-part fastener consists of a retainer for the stud and is indicated generally at 29 in the succeeding figures. It is formed by shearing, bending and pressing a flat sheet of metal so as to have a flat body portion 30, a pair of similar upstanding arms 31 and 32 each formed with sloping shoulders such as those shown at 33 and 34, and two humps 35 and 36 providing tunnels 37 and 38. The humps 35 and 36 are formed by making two parallel cuts 39 and 40 in the metal and then pressing the metal at 35 and 36 out of the plane of the body 30 so as to form the tunnels 37 and 38. The width of each tunnel is a little greater than the width of the foot of the stud 20 and the length of each tunnel is a little greater than the length of the foot. The flat body portion 30 of the retainer is made up of a central portion and four rectangular peripheral portions 30A, 30B, 30C and 30D, the latter portions lying at the four corners of the rectangular body portion.

The foundation of a trim-pad may consist of plywood or, more often, a resin-bonded hard-board, a portion of which is shown at 41 in Figure 7 onwards. The board is formed with small slots (not shown) of about ½" length and ¹⁄₁₆" width all over its surface, the slots passing right through the board so that steam may penetrate to the centre of the board during a subsequent treatment to be described.

In addition to these slots, at appropriate intervals around its edge the board is formed with holes of a cruciform shape as shown at 42 in Figure 7. The width E of the cross member of the hole is substantially equal to the external width of the humps 35 and 36 of the retainer and the width F of the stem, or other cross member, of the hole is equal to the width of an arm 31 or 32 near its root. The overall length and width of the hole is equal to the overall length and width of the body portion of the retainer.

Before any trimming material is applied to the board a retainer is inserted in each hole 42 from the rear face of the board; in Figure 9 this is the underside. Then the arms 31 and 32 of each retainer are clenched down onto the front (or top) face of the board into the position best shown in Figure 12. The sloping shoulders 33 and 34 serve the purpose of ensuring that the arms bend at the correct positions. Normally each arm would bend at its root, since this is the weakest point, but as the arms cannot bend here, they do so at that height up the sloping shoulders equal to the thickness of the board, thus ensuring that the arms clench tightly onto the rear (or front) face of the board.

A layer of cotton wool 43 is then applied over the whole of the rear face of the board and over the cotton wool is laid a sheet of Rexine 44, leather-cloth or the like the edges of which are pulled tight and lapped around the edge of the board 41 to be glued on the front face of the board as at 45.

The composite trim-pad so formed is then placed in a press into which steam is admitted which penetrates into the resin-bonded hardboard through the slots, serving to bind the whole board together. The press is also provided with a die which by pressure produces a decorative pattern on the rear face of the Rexine 44. The retainers are preferably located at positions clear of the decorative lines of the pattern.

When the trim-pad has been cooled and dried spring studs of the kind shown at 20 are engaged by their feet under the humps 35 and 36 (see Figure 14) and then the whole pad is fastened to a metal panel 46 of the car body. For this purpose the panel is formed with a series of circular holes such as that shown at 47 in Figure 14. The spacing of the holes 47 corresponds with that of the holes 42 in the pad so that a spring 20 can enter each hole in the panel, the elbows 24 and 25 snapping over the edges of the hole 47, to hold the pad securely to the panel.

Some of the advantages of the fastener described can now be appreciated more clearly. It can be seen from Figure 13 that when a retainer 29 has been fixed in the hard-board the retainer is standing proud of the board only by its own thickness, at the peripheral portions 30A, 30B, 30C and 30D on the rear face of the board and at the arm portions 31 and 32 (Figure 12) on the front face of the board. With a powerful clenching tool, however, the retainer can be squeezed into the board a little at these positions so that there is little if any difference in thickness between the board and retainer. It follows that when the composite trim-pad is placed in the press and squeezed the silhouette of the retainer does not show up on the Rexine, leather-cloth or the like.

Another advantage of this retainer, over those used hitherto, is that since the retainer substantially fills the hole into which it is secured, the cotton wool is not pressed through the hole in such a way as to produce a depression when the pad has been squeezed.

It is to be noted also that there is no portion of the retainer liable to be damaged when the pad is put into the squeezing press, since on neither side of the pad is there any portion of the retainer standing proud of the pad, except those portions 31, 32 on one face and portions 30A, B, C, D, on the other face which lie flat against the pad and are merely squeezed into the pad by the press.

What I claim is:

1. In a combination, a two-part snap fastener, and a sheet formed with a cruciform hole, said two-part snap fastener comprising a snap stud in the form of a single strip of spring metal bent to U-shape and having a snap engaging elbow, a neck, and outwardly directed feet, and a retainer for mounting said snap stud in the cruciform hole in said sheet, said retainer comprising a plate-like base having upper and lower sides, an opposed pair of substantially flat and coplanar peripheral portions having their upper sides engaged flatwise beneath one side of said sheet along respectively opposite edge portions of one cross portion of the cruciform hole, a pair of upstanding open-ended tunnels disposed between said peripheral portions, said tunnels being aligned end-to-end with one another and having adjacent ends spaced from one another, said tunnels lying substantially within the thickness of the sheet and within the respective opposite ends of said one cross portion and receiving the feet of said snap stud, the space between the adjacent ends of said tunnels being occupied by a central portion of said body, said feet engaging between said tunnels and said central portion, and a pair of arms extending upwardly from respectively opposite sides of said central portion, said arms engaging through the other cross portion of said cruciform hole and clenched outwardly and downwardly over the other side of said sheet.

2. The combination claimed in claim 1, the arms being of maximum width adjacent their free ends and being diminished in width at portions thereof adjacent their juncture with the base.

References Cited in the file of this patent

UNITED STATES PATENTS

| | | |
|---|---|---|
| 1,599,139 | Marshall | Sept. 7, 1926 |
| 2,037,301 | Ball | Apr. 14, 1936 |
| 2,207,374 | Fernberg | July 9, 1940 |